United States Patent [19]

Loev

[11] 3,719,677

[45] March 6, 1973

[54] TETRAHYDRO-3,6-DIPHENYLIMIDAZO(1,2-B)-AS-TRIAZINES

[75] Inventor: Bernard Loev, Broomall, Pa.

[73] Assignee: Smith Kline & French Laboratories, Philadelphia, Pa.

[22] Filed: Sept. 8, 1971

[21] Appl. No.: 178,838

[52] U.S. Cl..............................260/249.5, 424/249
[51] Int. Cl. .............................................C07d 55/10
[58] Field of Search....................................260/249.5

[56] References Cited

UNITED STATES PATENTS 3,631,040   12/1971   Loev ...............................260/249.5

Primary Examiner—John M. Ford
Attorney—William H. Edgerton et al.

[57] ABSTRACT

The compounds are tetrahydro-3,6-diphenylimidazo-[1,2-b]-as-triazines which have hypotensive activity.

4 Claims, No Drawings

TETRAHYDRO-3,6-DIPHENYLIMIDAZO(1,2-B)-AS-TRIAZINES

This invention relates to new tetrahydro-3,6-diphenylimidazo[1,2-b]-as-triazines having pharmacodynamic activity, in particular hypotensive activity. The hypotensive activity of the compounds of this invention is demonstrated, for example, by administration to neurogenic hypertensive dogs at doses of about 10 to 30 mg./kg. orally or to metacorticoid hypertensive rats at doses of about 80 mg./kg. orally.

The tetrahydro-3,6-diphenylimidazo[1,2-b]-as-triazines of this invention are represented by the following formula:

FORMULA I

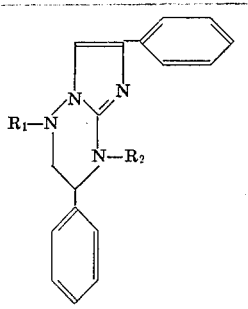

in which:

$R_1$ and $R_2$ are hydrogen, lower alkyl or lower alkanoyl and pharmaceutically acceptable, acid addition salts thereof.

The pharmacodynamically active compounds of this invention have the basic structure of Formula I. However, it is apparent to one skilled in the art that well known nuclear substituents may be incorporated on the phenyl rings. Such substituents, which are known to the art, are lower alkyl, lower alkoxy, trifluoromethyl or halogen. The substituents are preferably in the ortho or meta position. These substituted compounds are used as are the parent compounds.

Advantageous compounds of this invention are represented by Formula I in which $R_1$ and $R_2$ are hydrogen, methyl or acetyl, preferably hydrogen or acetyl.

A preferred compound of this invention is represented by Formula I in which $R_1$ and $R_2$ are hydrogen, said compound being 1,2,3,4-tetrahydro-3,6-diphenylimidazo[1,2-b]-as-triazine.

The pharmaceutically acceptable, acid addition salts of the compounds of Formula I, which are included in this invention, are formed with organic and inorganic acids by methods known to the art. The base is reacted with an organic or inorganic acid in aqueous miscible solvent, such as acetone or ethanol, with isolation of the salt by concentration and cooling or in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The tetrahydro-3,6-diphenylimidazo[1,2-b]-as-triazines of this invention are prepared by the following procedure:

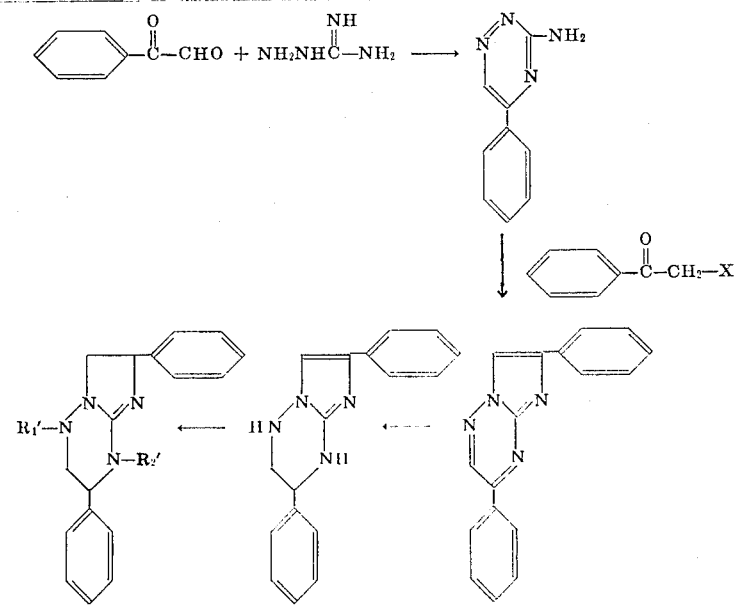

The terms $R_1'$ and $R_2'$ are lower alkyl or lower alkanoyl and X is halogen.

According to the above procedure, phenylglyoxal and aminoguanidine are reacted at elevated temperature to give 3-amino-5-phenyl-as-triazine. The phenylglyoxal is conveniently used as its hydrate. The reaction is preferably carried out in aqueous acid solution at elevated temperature, for example, at about 65° C. to reflux temperature.

The 3-amino-5-phenyl-as-triazine is reacted with a phenyl halomethyl ketone at elevated temperature in an inert solvent, such as tetrahydrofuran, in the presence of an acid acceptor, such as dimethylaniline, to give 3,6-diphenylimidazo-[1,2-b]-as-triazine.

3,6-Diphenylimidazo[1,2-b]-as-triazine is reduced with a reducing agent such as sodium borohydride to give tetrahydro-3,6-diphenylimidazo[1,2-b]-as-triazine which is a compound of this invention.

To prepare the N-lower alkanoyl compounds of this invention the N-unsubstituted tetrahydro-3,6-diphenylimidazo-[1,2-b]-as-triazine is reacted with a lower alkanoyl halide or lower alkanoic acid anhydride.

The N-lower alkyl compounds of this invention are preferably prepared by reducing the appropriate N-lower alkanoyl compound. Alternatively, the N-lower alkyl compounds may be prepared by reacting the N-unsubstituted tetrahydro-3,6-diphenyl-imidazo[1,2-b]-as-triazine with a lower alkyl halide.

Substituents, such as lower alkyl, lower alkoxy, trifluoromethyl or halogen, may be present on the phenyl ring of the phenylglyoxal and/or the phenyl halomethyl ketone starting materials to prepare substituted tetrahydro-3,6-diphenylimidazo[1,2-b]-as-triazines.

Although the tetrahydro-3,6-diphenylimidazo[1,2-b]-as-triazines of this invention are drawn herein as having the 1,2,3,4-tetrahydro structure, the positions of the double bonds are not known with certainty and thus it is understood that these compounds may exist in other tautomeric forms, for example, these compounds may have the following 1,2,3,5- or 1,4,6,7- tetrahydro structures:

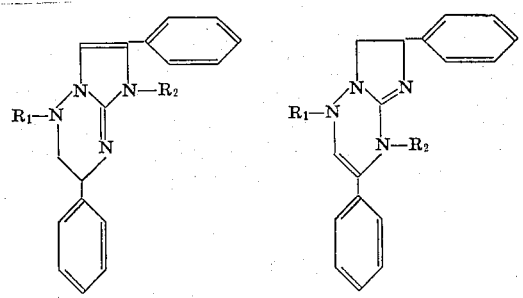

The compounds of this invention may be combined with pharmaceutical carriers according to accepted pharmaceutical practices to form pharmaceutical compositions.

The terms "lower alkyl," "lower alkanoyl," and "lower alkoxy" where used herein denote groups having one to four carbon atoms.

The following examples are not limiting but are illustrative of the compounds of this invention and processes for their preparation.

EXAMPLE 1

3,6-Diphenylimidazo[1,2-b]-as-triazine (7.5 g.) is stirred with 450 cc. of methanol. The mixture is heated to reflux on a steam bath with stirring, then removed from the steam bath. Sodium borohydride (10 g.) is added portionwise with stirring, with vigorous hydrogen evolution after each portion is added. The temperature is about 55° C. during the addition. After the addition is completed, stirring is continued for 4.5 hours while allowing the mixture to come to room temperature. The mixture is then chilled in ice and the solid material is filtered off. The solid material is stirred with chloroform and the material obtained after filtering is recrystallized from dimethylformamide to give 1,2,3,4-tetrahydro-3,6-diphenylimidazo[1,2-b]-as-triazine.

EXAMPLE 2

Four grams of 1,2,3,4-tetrahydro-3,6-diphenylimidazo-[1,2-b]-as-triazine (prepared as in Example 1) is refluxed in 200 ml. of acetic anhydride for 15–20 minutes. The solution is filtered while hot, then allowed to stand and cool for one hour, and then concentrated to dryness in vacuo.

The residue is stirred with 200 ml. of dilute hydrochloric acid, then filtered through Super-Cel (infusorial earth). The filtrate is made basic with 40 percent aqueous sodium hydroxide with vigorous stirring and cooling. The solid material is filtered off, then dissolved in chloroform. The solution is dried over magnesium sulfate and filtered. The filtrate is partially concentrated in air, then hexane is added and the mixture is chilled and filtered to give a solid which is recrystallized from chloroform-hexane to give 1,4-diacetyl-1,2,3,4-tetrahydro-3,6-diphenylimidazo[1,2-b]-as-triazine.

EXAMPLE 3

Reacting 1,2,3,4-tetrahydro-3,6-diphenylimidazo-[1,2-b]-as-triazine (prepared as in Example 1) with one equivalent of acetic anhydride by the procedure of Example 2 gives a mixture of 1-acetyl-1,2,3,4-tetrahydro-3,6-diphenyl-imidazo[1,2-b]-as-triazine and 4-acetyl-1,2,3,4-tetrahydro-3,6-diphenylimidazo[1,2-b]-as-triazine. The compounds are separated by fractional recrystallization.

EXAMPLE 4

To a solution containing 0.28 g. of diborane in 50 ml. of tetrahydrofuran, under nitrogen, is added a solution of 3.6 g. of 1,4-diacetyl-1,2,3,4-tetrahydro-3,6-diphenyl-imidazo[1,2-b]-as-triazine (prepared as in Example 2) in 20 ml. of tetrahydrofuran over 15 minutes while maintaining the temperature at 0°–10° C. After the addition is complete, the mixture is refluxed for 1 hour, then cooled and made acidic with 5 percent hydrochloric acid. The mixture is then made basic with 10 percent aqueous sodium carbonate solution and extracted with ether. The extract is dried and concentrated in vacuo to give as the residue 1,4-diethyl-1,2,3,4-tetrahydro-3,6-diphenylimidazo-[1,2-b]-as-triazine.

By the same procedure, using 1-acetyl-1,2,3,4-tetrahydro-3,6-diphenylimidazo[1,2-b]-as-triazine, prepared as in Example 3, the product is 1-ethyl-1,2,3,4-tetrahydro-3,6-diphenylimidazo[1,2-b]-as-triazine.

In the same manner, using 4-acetyl-1,2,3,4-tetrahydro-3,6-diphenylimidazo[1,2-b]-as-triazine, prepared as in Example 3, the product is 4-ethyl-1,2,3,4-tetrahydro-3,6-diphenylimidazo-[1,2-b]-astriazine.

EXAMPLE 5

Four grams of 1,2,3,4-tetrahydro-3,6-diphenylimidazo-[1,2-b]-as-triazine (prepared as in Example 1) is dissolved in 200 ml. of acetic formic mixed anhydride and the resulting solution is heated for 15 minutes, then concentrated in vacuo. Chloroform is added to the residue. The mixture is filtered and hexane is added to the filtrate to precipitate 1,4-diformyl-1,2,3,4-tetrahydro-3,6-diphenylimidazo[1,2-b]-as-triazine.

By the procedure of Example 4, the formyl groups of the above prepared compounds are reduced using diborane in tetrahydrofuran to give 1,2,3,4-tetrahydro-1,4-dimethyl-3,6-diphenylimidazo[1,2-b]-as-triazine.

EXAMPLE 6

Reacting 1,2,3,4-tetrahydro-3,6-diphenylimidazo-[1,2-b]-as-triazine with one equivalent of acetic formic mixed anhydride by the procedure of Example 5 gives a mixture of 1-formyl-1,2,3,4-tetrahydro-3,6-diphenylimidazo[1,2-b]-as-triazine and 4-formyl-1,2,3,4-tetrahydro-3,6-diphenylimidazo-[1,2-b]-as-triazine. The compounds are separated by fractional recrystallization.

Reducing the formyl groups of the above prepared compounds by the procedure of Example 4 gives 1-methyl-1,2,3,4-tetrahydro-3,6-diphenylimidazo[1,2-b]-as-triazine and 4-methyl-1,2,3,4-tetrahydro-3,6-diphenylimidazo[1,2]-as-triazine.

EXAMPLE 7

A mixture of 2 g. of 1,2,3,4-tetrahydro-3,6-diphenylimidazo[1,2-b]-as-triazine (prepared as in Example 1), 10 ml. of propionyl chloride and 50 ml. of pyridine is heated at reflux for 20 minutes. The mixture is concentrated in vacuo and chloroform is added to the residue. The mixture is filtered and hexane is added to the residue to precipitate 1,2,3,4-tetrahydro-3,6-diphenyl-1,4-dipropionylimidazo[1,2-b]-as-triazine.

Reducing the propionyl groups of the above prepared compound by the procedure of Example 4 using diborane in tetrahydrofuran gives 1,2,3,4-tetrahydro-3,6-diphenyl-1,4-dipropylimidazo[1,2-b]-as-triazine.

Similarly, using butyryl chloride in place of propionyl chloride, there is obtained 1,4-dibutyryl-1,2,3,4-tetrahydro-3,6-diphenylimidazo[1,2-b]-as-triazine. Reducing the butyryl groups with diborane in tetrahydrofuran by the procedure of Example 4 gives 1,4-dibutyl-1,2,3,4-tetrahydro-3,6-diphenylimidazo[1,2-b]-as-triazine.

EXAMPLE 8

Reacting 1,2,3,4-tetrahydro-3,6-diphenylimidazo-[1,2-b]-as-triazine (prepared as in Example 1) with one equivalent of propionyl chloride by the procedure of Example 7 gives a mixture of 1,2,3,4-tetrahydro-3,6-diphenyl-1-propionylimidazo[1,2-b]-as-triazine and 1,2,3,4-tetrahydro-3,6-diphenyl-4-propionylimidazo[1,2]-as-triazine. The compounds are separated by fractional recrystallization.

Reducing the propionyl groups of the above prepared compounds by the procedure of Example 4 gives 1,2,3,4-tetrahydro-3,6-diphenyl-1-propylimidazo[1,2-b]-as-triazine and 1,2,3,4-tetrahydro-3,6-diphenyl-4-propylimidazo[1,2-b]-as-triazine.

Similarly, using butyryl chloride in place of propionyl chloride, there is obtained a mixture of 1-butyryl-1,2,3,4-tetrahydro-3,6-diphenylimidazo[1,2-b]-as-triazine and 4-butyryl-1,2,3,4-tetrahydro-3,6-diphenylimidazo[1,2-b]-as-triazine, which are separated by fractional recrystallization. Reducing the butyryl groups of these compounds by the procedure of Example 4 gives 1-butyl-1,2,3,4-tetrahydro-3,6-diphenylimidazo[1,2-b]-as-triazine and 4-butyl-1,2,3,4-tetrahydro-3,6-diphenylimidazo[1,2-b]-as-triazine.

EXAMPLE 9

To a refluxing mixture of 20.6 g. of 3-amino-5-phenyl-as-triazine and 21.8 g. of dimethylaniline in 200 ml. of dry tetrahydrofuran is added 42 g. of 2-bromo-3'-chloroaceto-phenone. The refluxing is continued for 4 hours, then the mixture is concentrated in vacuo. The residue is covered with ethanol, then stirred with 18 percent hydrochloric acid. The solid material is filtered off. This material is warmed in acetonitrile. After chilling and filtering, 6-(m-chlorophenyl)-3-phenylimidazo[1,2-b]-as-triazine is obtained.

To a suspension of 20.5 g. of 6-(m-chlorophenyl)-3-phenylimidazo[1,2-b]-as-triazine in 650 ml. of isopropanol is added 12.6 g. of sodium borohydride at room temperature. The mixture is heated at reflux for 2 hours, then allowed to cool to room temperature. Water (150 ml.) is added dropwise with stirring and the mixture is stirred at room temperature, then chilled and filtered to give 6-(m-chlorophenyl)-1,2,3,4-tetrahydro-3-phenylimidazo[1,2-b]-as-triazine.

EXAMPLE 10

By the procedure of Example 9, using 2-bromo-2'-chloroacetophenone in place of 2-bromo-3'-chloroacetophenone, the product is 6-o(chlorophenyl)-1,2,3,4-tetrahydro-3-phenyl-imidazo[1,2-b]-as-triazine.

EXAMPLE 11

By the procedure of Example 9, using in place of 2-bromo-3'-chloroacetophenone the following:
2-bromo-2'-methylacetophenone
2-bromo-3'-methoxyacetophenone
2-bromo-3'-trifluoromethylacetophenone the products are, respectively:
1,2,3,4-tetrahydro-3-phenyl-6-(o-tolyl)imidazo[1,2-b]-as-triazine
1,2,3,4-tetrahydro-6-(m-methoxyphenyl)-3-phenylimidazo-[1,2-b]-as-triazine
1,2,3,4-tetrahydro-3-phenyl-6-(m-trifluoromethylphenyl)-imidazo[1,2-b]-as-triazine.

What is claimed is:
1. A compound of the formula:
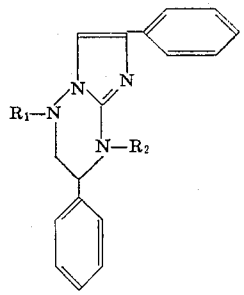
in which:
R₁ and R₂ are hydrogen, lower alkyl or lower alkanoyl, or a pharmaceutically acceptable acid addition salt thereof.
2. A compound of claim 1 in which R₁ and R₂ are hydrogen, methyl or acetyl.
3. A compound of claim 1 in which R₁ and R₂ are hydrogen.
4. A compound of claim 1 in which R₁ and R₂ are acetyl.
* * * * *